June 25, 1963  H. RUMSEY, JR  3,095,308
METHOD FOR PRESSURE-PACKING OF MEAT PRODUCTS
Filed June 15, 1959  5 Sheets-Sheet 1
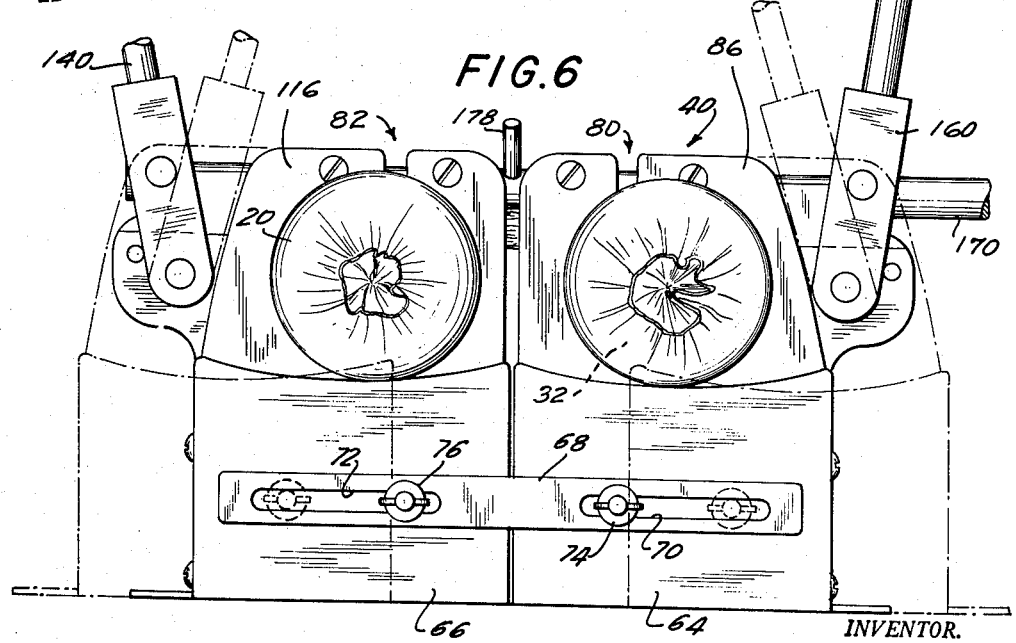
INVENTOR.
HERBERT RUMSEY JR.
BY
ATTORNEY

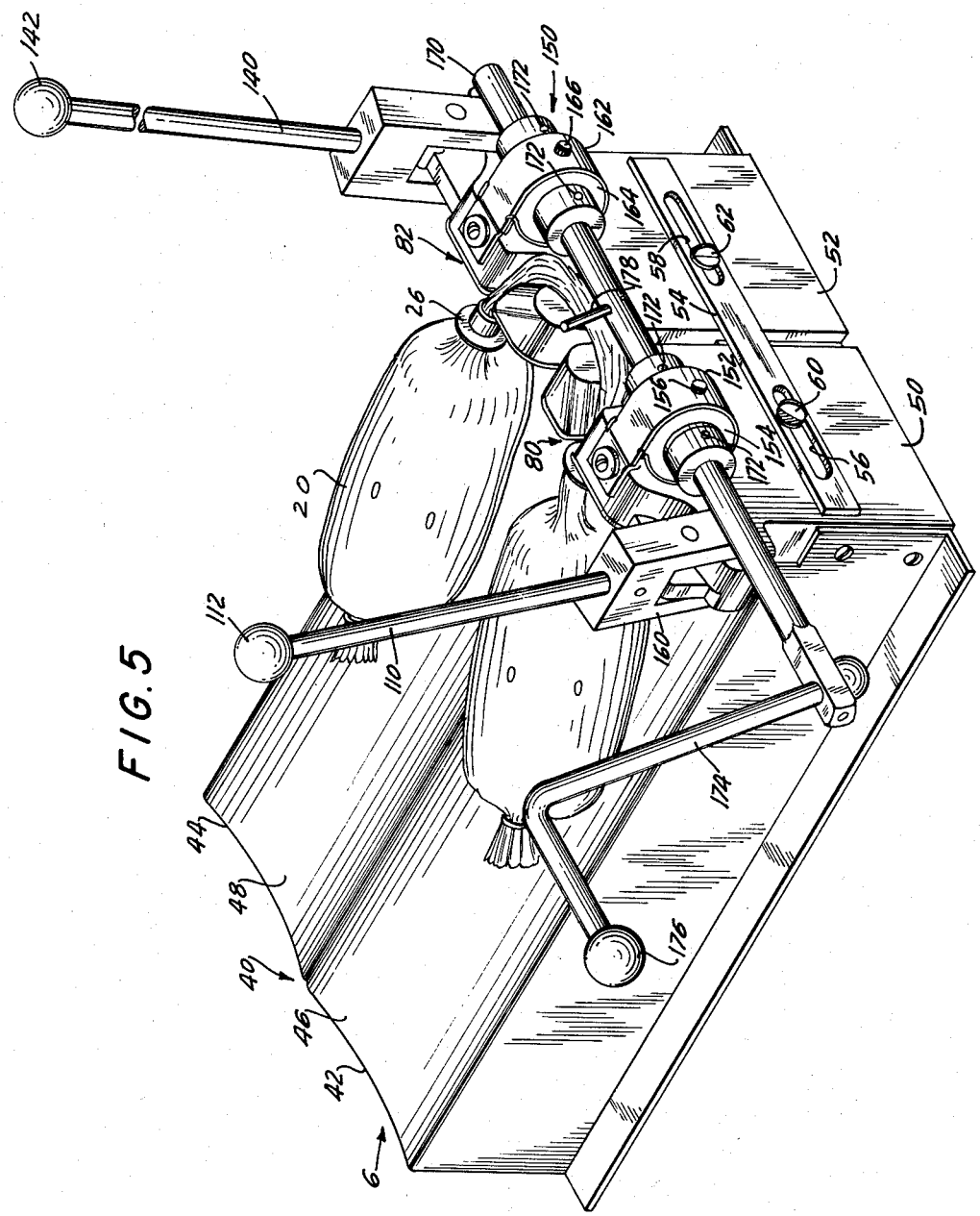

INVENTOR.
HERBERT RUMSEY JR.
BY
ATTORNEY

June 25, 1963  H. RUMSEY, JR  3,095,308
METHOD FOR PRESSURE-PACKING OF MEAT PRODUCTS
Filed June 15, 1959  5 Sheets-Sheet 4

INVENTOR.
HERBERT RUMSEY JR.
BY
Kane, Dalsimer and Kane
ATTORNEY

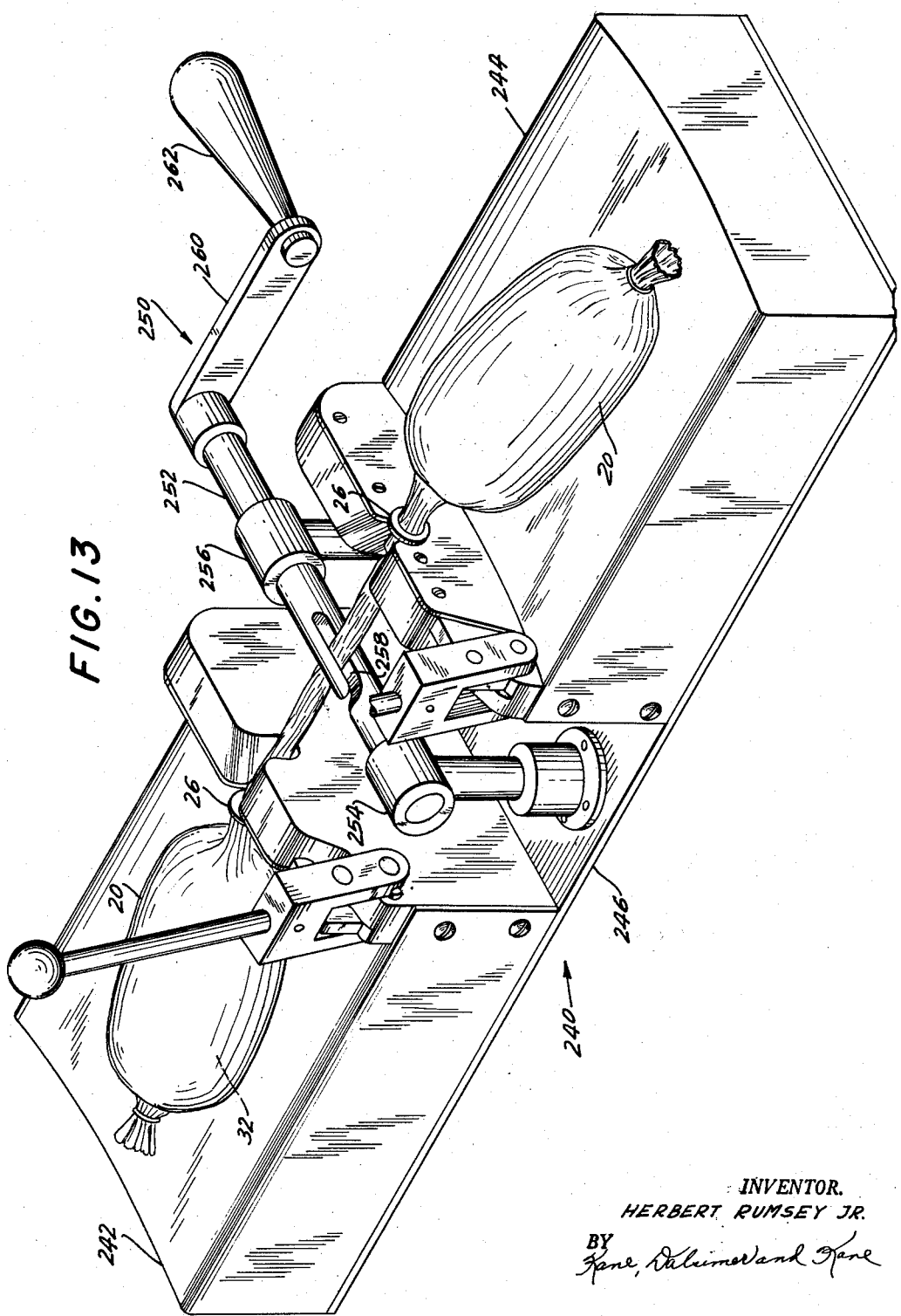

United States Patent Office 3,095,308
Patented June 25, 1963

3,095,308
METHOD FOR PRESSURE-PACKING OF
MEAT PRODUCTS
Herbert Rumsey, Jr., P.O. Box 630, Rochester, N.Y.
Filed June 15, 1959, Ser. No. 820,547
1 Claim. (Cl. 99—174)

This invention relates to meat packing, and more particularly to the processing of boneless meat products into a compressed state in casings, whereby these products may be rigidified while in this state by employing further processing techniques for this purpose.

An object of this invention is to provide a functionally and structurally improved apparatus for pressure-packing meat edibles into a casing wherein such edibles adjacent the casing ends are capable of being independently compressed therein; and, under such circumstances, more than one meat edible can be within the casing adjacent any one or both of the casing ends during such compression.

Another object is to provide a method of processing meat edibles into a pressurized condition within a casing wherein more than one meat edible can be packed within this casing to be independently or cooperatively compressed therein and maintained in such compressed condition.

A further object is to provide an assembly of meat edibles packed in accordance with the teachings of the aforementioned apparatus and method, which assembly facilitates the practice of more efficient meat hanging and smoking techniques.

These and other objects and advantages will become apparent from the following detailed description which is to taken in conjunction with the accompanying drawings illustrating practical embodiments of the invention and in which:

FIG. 1 is a perspective view on a reduced scale of a casing usable with the present invention;

FIG. 2 is a perspective view of a deformable grommet adapted for use with the present invention;

FIG. 3 is a perspective view of a pair of such grommets mounted on the casing, which is in a wet condition and thus readily workable;

FIG. 4 is a perspective view of the casing under such circumstances with meat edibles inserted therein adjacent its ends and maintained therein by suitably securing both casing ends;

FIG. 5 is a perspective view of the meat product assembly of FIG. 4 mounted on an apparatus for pressure-packing the meat edibles under compression within the casing;

FIG. 6 is a rear elevational view of the apparatus and meat product assembly of FIG. 5 with certain parts removed and the adjustability of such apparatus illustrated by way of phantom;

FIG. 13 is a perspective view of a further embodiment of apparatus for pressure-packing meat products in accordance with the present invention.

Figure 7:
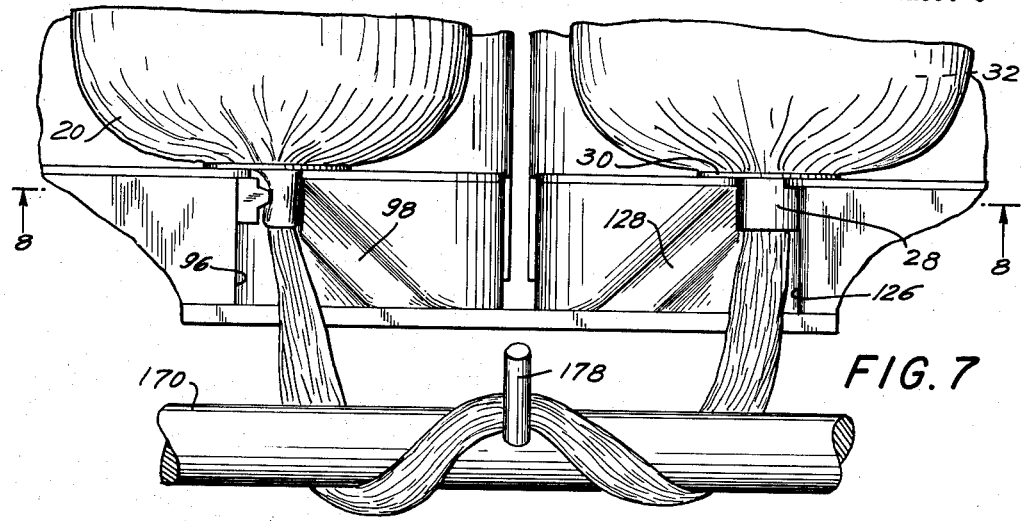
FIG. 7 is a fragmentary plan view of the pressure-packing apparatus in a condition under which the meat edibles are pressurized within the casing and one of the grommets crimped to maintain such pressurized condition for its associated meat edible.
Figure 8:
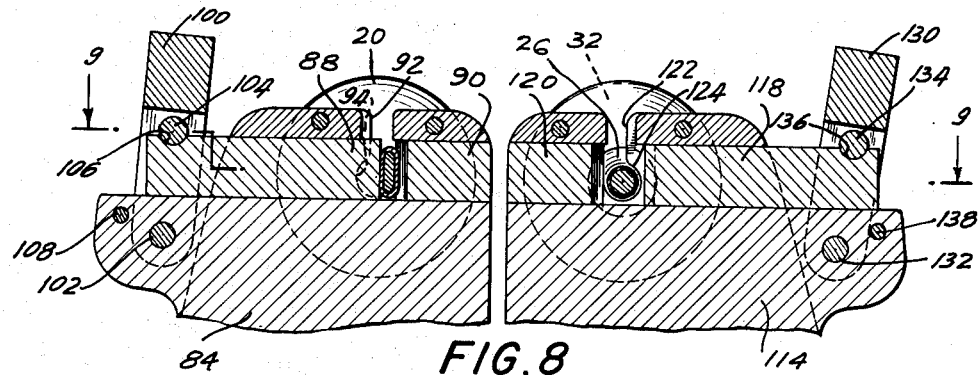
FIG. 8 is a fragmentary sectional view taken along the line 8—8 of FIG. 7.
Figure 9:
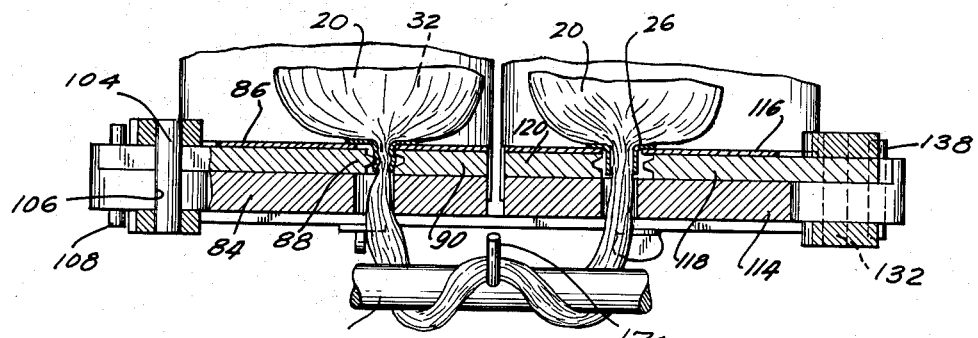
FIG. 9 is a fragmentary sectional view taken along the line 9—9 of FIG. 8.

In accordance with usual meat packing techniques, boneless hams, shoulders, smoked butts, etc. are encased in a sheet of hydrocellulose or other cellulosic fibre material. Thus, in the present invention, a preformed hydrocellulose casing 20 is employed for purposes of molding and enclosing such meat products. This casing 20 possesses predetermined dimensions, depending upon the particular meat products to be encased thereby; and, for shipping and storage conditions and requirements, these casings are usually supplied in a substantially flat condition—as illustrated in FIG. 1—and may be further folded, if desired, in an effort to conserve space. Under certain conditions, a stockinette-type of tubing can be employed for encasing the meat products. In any event, a casing 20 will have a pair of open ends 22 and 24. The present invention contemplates encasing at least two meat edibles within casing 20, and consequently this casing 20 should be of sufficient length to conveniently accommodate such quantities. Naturally, the meat edibles to be packed will have some effect on the length selected, as well as the transverse dimensioning of such casing. As the number and size of meat edibles to be encased increases, the length of casing 20 will increase, with the minimum length of casing for a pair of smoked butts being approximately 36 inches.

Prior to inserting the particular meat edibles therein, the casing 20 is subjected to a wetting operation to increase its pliability and workability. Under ordinary circumstances, this wetting operation usually lasts for approximately 5 minutes. At the termination of this operation, at which time it may be desirable to encase a pair of meat edibles, a pair of deformable grommets 26 are telescoped over the casing 20 in back-to-back relationship, as illustrated in FIG. 3.

The grommets 26 usable with the present invention include a tubular boss 28 extending from a radial flange 30. The grommets 26 are placed over the wet casing 20 such that the annular flange 30 of the grommets 26 is adapted to abut or be disposed adjacent the inner end of the inserted meat edibles 32. In this connection, the meat edibles 32 are inserted into each of the open ends 22 and 24 of the wet casing 20 by means of the usual stuffing horn (not shown).

The opposed open ends 22 and 24 of casing 20 are then secured by means of cord, twine, wire, the grommet 26 of FIG. 2, or seals of a construction similar to that disclosed in U.S. Patent No. 2,702,930. Obviously, such seals, as well as grommets 26, should be deformed or crimped to adequately seal and securely close the casing open ends 22 and 24. Thus, in FIG. 4 the casing ends 22 and 24 are suitably sealed by the selected closure means 34 and 36, respectively.

Although the hydrocellulose casing 20 is inherently porous to facilitate the application of any subsequent smoking operation for the selected meat edibles 32, a number of openings 33 are either preformed or perforated to permit the escape of air entrapped within casing 20 upon the insertion of the meat edibles 32 through the casing open ends 22 and 24.

The package assembly of FIG. 4 is then placed upon a pressure-packing apparatus 40 constructed and arranged in accordance with the present invention. The apparatus 40 is comprised of a pair of laterally shiftable base sections 42 and 44. These base sections are formed with a top 46 and 48, respectively, of sufficient length to accommodate the various sizes and number of meat edibles 32 to be packed, and degree of curvature for purposes of accommodating the usually cylindrical-shaped meat edibles to prevent undesirable shifting thereof on the base section during this stage of meat packing wherein the meat edibles are compressed within the casing. The shifting of the base sections 42 and 44 may be accomplished by structure which includes at the front ends 50 and 52 of base sections 42 and 44, respectively, a plate 54 which is slotted at 56 and 58 adjacent both of its respective ends. Locking screws 60 and 62 are threaded into the ends 50 and 52, respectively, while passing through the associated slots 56 and 58 of the plate 54.

A similar structural arrangement is mounted at the other base section ends 64 and 66. Thus, this structural arrangement will include a plate 68 having formed therein longitudinally extending slots 70 and 72. Locking screws 74 and 76 extend through slots 70 and 72, respectively, into suitably tapped bores in base section ends 64 and 66, respectively.

Accordingly, the base sections 42 and 44 are shiftable from a position adjacent one another—as represented by the solid lines of FIG. 6—to a position laterally spaced from one another—as illustrated by the phantom lines of this figure. Under such circumstances, one or both of the locking screws at the opposed ends of the respective base sections 42 and 44 are loosened, depending upon the degree of adjustment. When the proper adjustment and spacing of the base sections with respect to one another is obtained, the locking screws are then tightened to secure the base sections in the preselected spaced-apart relationship.

A closure support head 80 is mounted on each of the base sections 42 and 44 adjacent their front ends 50 and 52, respectively. Closure support head 80 includes a pair of upstanding plates 84 and 86 which cooperate to mount complementary crimping jaws 88 and 90, the former of which is movable with respect to such plates while the latter is stationary relative thereto. Plate 86 is provided with a vertical slot 92 having a width less than the diameter of the tubular section 28 of the grommets 26, and extends into a substantially circular opening 94 adjacent the slot base of sufficient diameter to readily receive this tubular portion 28. Opening 94 is, however, of less diameter than the maximum effective diameter of the annular flange 30 of these grommets to prevent them from being inserted entirely therethrough. As will be observed, the slidable or shifting crimping jaw 88 is adapted to traverse the slotted opening to thereby crimp the deformable tubular portion 28 of the grommets 26.

The plate 86 is similarly slotted at 96. This slot 96 increases in width in a forward direction from a location adjacent the plate 86 by providing a beveled face 98 for such purpose. This beveled face 98 facilitates the accommodation of the gathered or pleated portion of the casing 20 disposed between the telescoped grommets 26; and additionally cooperates to decrease and minimize the number of sharp edges adapted to encounter such gathered sectors of casing 20 during the pressure-packing operation.

The jaw 88 is shiftable relative to its mating stationary jaw 90 by means of a linkage which includes a bifurcated member 100 pivotally mounted on plate 84 by means of a suitable pivotal connection 102. The bifurcated member 100 is in engagement with the slidable jaw 88 through pin 104 which is adapted to ride in a suitably formed recess 106 in the upper face of this jaw. A stop pin 108 is adapted to abut against the bifurcated member 100 and thereby prevent more than the necessary retraction of the sliding jaw 88 when it is moved to its open position. A lever arm 110 extends from the upper face of the bifurcated member 100 and terminates in a handle 112 to permit the operator to shift the crimping jaw 88 for purposes of deforming the grommets 26.

A substantially similar and complementary closure support 82 extends from the upper face 48 of the base section 44. In this connection, plates 114 and 116 cooperate to mount a movable jaw 118 and stationary jaw 120, which cooperate with one another to crimp the deformable grommets 26. Under such circumstances, the plate 116 will be formed with a vertical slot 122 having a width of lesser dimension than the diameter of the tubular section 28 of the grommets 26. This vertical slot 122 extends into a substantially circular opening 124 which is adapted to readily receive this tubular section 28. The plate 114 is additionally formed with a vertical slot 126 of increasing width in a direction away from the plate 116. This increasing width is supplied by the beveled face 128 which converges towards the beveled face 98 of the other associated closure support.

The sliding jaw 118 is shifted by means of a linkage which includes bifurcated member 130 journaled to plate 114 by means of a pivotal connection 132. This bifurcated member 130 is in engagement with the sliding jaw 118 by means of a pin 134 which cooperates with a slot 136 formed in the upper face of this jaw. A stop pin 138 projects from plate 114 and is adapted to bear against bifurcated member 130 and thereby limit the retraction of the sliding jaw 118. The shifting of the bifurcated member 130 is facilitated by a lever arm 140 projecting upwardly from the upper face of the bifurcated member 130 and is readily manipulated by means of a suitably formed handle 142 located at the upper end of this arm. Thus, when the lever arm 140 is shifted inwardly, by means of handle 142, the crimping jaw 118 is adapted to cooperate with the stationary jaw 120 to deform the tubular sector 28 of grommets 26.

Prior to the deformation of the grommets 26 supported within the closure supports 80 and 82, the meat edibles 32 are pressurized within the casing 20. To this end, a casing tension-applying assembly is located adjacent and forwardly of the closure supports 80 and 82. Accordingly, a bracket 152 is anchored to plate 84 of closure support 80 and mounts a bearing 154 which is adapted to be lubricated through a suitable lubricating port 156.

A bracket 162, on the other hand, is anchored to plate 114 of closure support 82 for purposes of mounting bearing 164 which once again is adapted to be lubricated through the bracket 162 by a lubricating port 166. The bearings 154 and 164 have journaled therein a rod 170 which is shiftable relative to such bearing by means of the usual set screws 172. To facilitate the rotation of the rod 170, a crank arm 174, with handle 176, projects from one of the ends of this rod 170.

The meat edibles 32 are compressed within the casing 20 through pressure transmitted by the annular flanges 30 of grommets 26 upon the rotation of rod 170. In this connection, the projecting pin 178 is adapted to engage the gathered central section of the casing 20 and twist it around rod 170 upon the rotation of the crank arm 174 about the axis of rotation of the rod 170. Thus, the casing 20 is tensioned through the grommets 26 to thereby compress the meat edibles 32.

When the desired amount of pressurization of the meat edibles 32 is obtained, the sliding jaws 88 and 118 are shifted inwardly by means of their respective handles 112 and 142 to thusly crimp the associated tubular sections 28 of the grommets 26. Under such circumstances, the pressurized condition of the meat edibles 32 will be maintained within the casing 20. The slidable crimping jaws 88 and 118 are then opened, the gathered central sections of the casing 20 untwisted, and the casing 20, with its contained pressurized meat edibles 32, subsequently removed from the pressure-packing apparatus 40.

Figure 10:
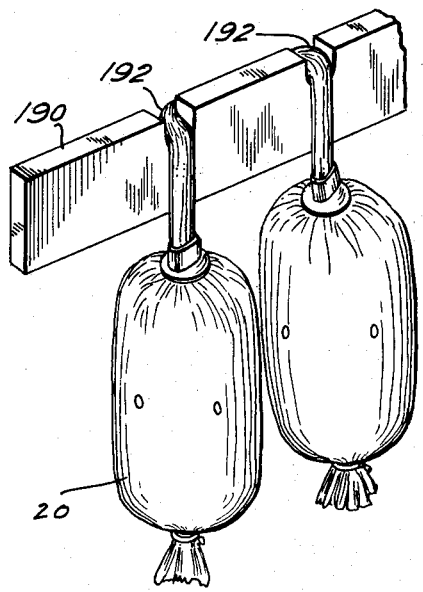
FIG. 10 is a perspective view of the pressurized meat product suspended from a smoking tree, illustrated fragmentarily, for purposes of subjecting the encased meat edibles to the usual smoking techniques.

If a smoking operation is contemplated for the packed meat edibles 32, the compressed meat products are then suspended from a smoking tree 190, fragmentarily illustrated in FIG. 10. The branches of this smoking tree 190 are usually formed with spaced notches 192 which conveniently receive the gathered central section of the casing 20 and thereby maintain the pressurized meat edibles 32 in the desired spaced-apart relationship to facilitate more effective smoke penetration. The tree 190 is then passed through the usual smokehouse or room for the proper period of time to expose the pressurized meat edibles 32 to such conditions. The inherent porosity of the casing 20, together with the apertures 33, permits uniform and thorough penetration of the meat edibles 32 during this operation.

As was mentioned in the foregoing, the meat edibles 32 are inserted into casing 20 while the latter is in a wet condition. As a result of the smoking operation, the casing 20 is ultimately dried to mold firmly about the compressed meat edibles 32. This molding is of such a nature that when the casing 20 is dried, the crimped grommets 26, as well as the seals 34 and 36, may be severed from the casing 20 without affecting the casing molded about the meat product 32. Naturally, other drying techniques employed in the art may be resorted to if a smoking operation is not contemplated. Heat treatment at sufficiently high temperatures, either in water or dry heat, cooperates to provide the molded shape of the meat product. Similar results are possible by employing a freezing operation.

Figure 11:
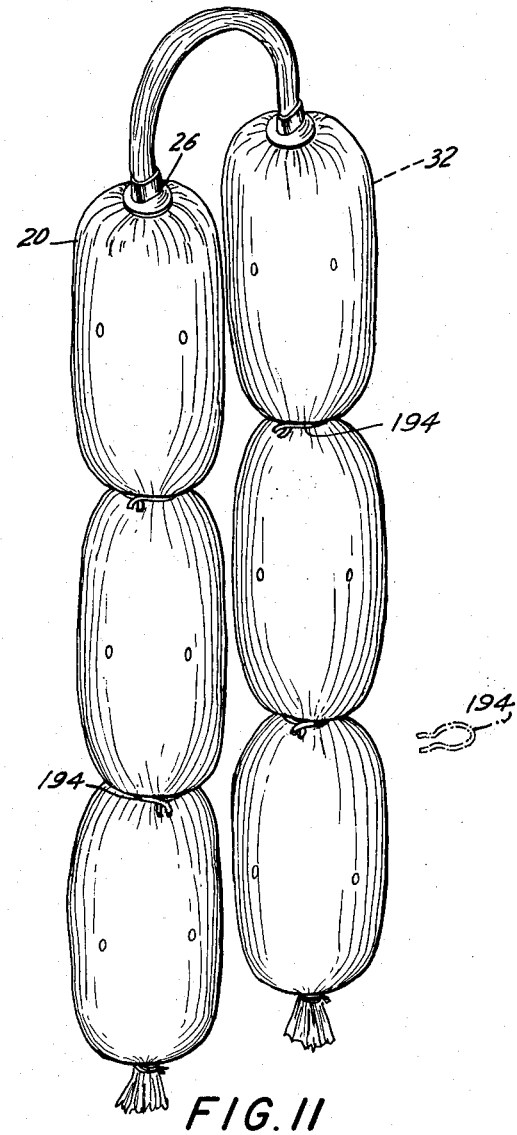
FIG. 11 is a further embodiment of an assembly of meat products in which more than two meat edibles are encased within a casing and pressurized therein in accordance with the present invention.

A meat product assembly is illustrated in FIG. 11 in which more than two meat edibles 32 are contained within casing 20. This increased number of meat edibles 32 are encased and pressurized in substantially the same manner as that previously described and illustrated. However, the meat edibles 32 of present concern are segregated from one another within the casing 20 by employing suitable dividers 194 which may take the form of manually operated spring clamps. These clamps 194 are placed upon casing 20 between the meat edibles 32 prior to the pressure-packing operation performed by apparatus 40.

When the casing 20 has had an opportunity to dry, as for example by means of the usual smoking cycle, the casing between the meat edibles 32 is suitably severed either before or after the removal of the dividing clamps 194. Naturally, the gathered central sector of casing 20 will also be removed and the compressed meat edibles 32 held in such position by the inherent molding effect provided by the dried casing material.

Figure 12:
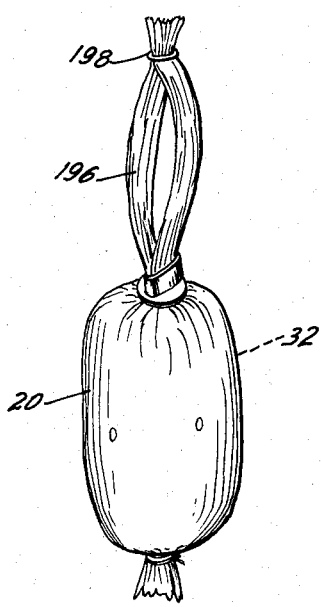
FIG. 12 is a further embodiment of means for permitting a meat product processed in accordance with the present invention to be suspended on the usual smoking tree.

As the size of the meat edibles 32 increases, problems may ensue in properly suspending such edibles, especially during the smoking operation. Accordingly, in FIG. 12 a modification of meat-edible suspending means is illustrated wherein the gathered sector of casing 20 is suitably slit longitudinally, as at 196, and the free end of such gathered sector reinforced by a clip 198. A knot may be tied into the free end of such gathered sector without the necessity of employing a clip 198, which is normally utilized when the entire casing 20, including the gathered sector, is suspended while in a wet condition. To facilitate the formation of slit 196, and the hanging of the meat edibles 32 of increased size and dimension, the gathered sector may be dried before remaining portions of the casing 20 are so conditioned. In this connection, a conventional hot-plate may be utilized to dry the gathered sector rapidly.

In FIG. 13 a further embodiment of pressure-packing apparatus is illustrated and is generally represented by numeral 240. Obviously, the base sections 242 and 244 are spaced longitudinally, one from the other. These base sections 242 and 244 may be suitably mounted on a table, plate, or the like, 246 and be in all other respects substantially similar to the base sections previously described. Furthermore, these base sections may include substantially similar closure supports and grommet-crimping mechanisms. Under such circumstances, such base sections, with their mounted apparatus, will not be described and illustrated in detail and, for a more complete disclosure thereof, reference is made to analogous structure previously resorted to in connection with the apparatus disclosed in FIGS. 5–9.

As illustrated, base sections 242 and 244 are mounted on the table 246 such that their respective closure supports face one another, as illustrated. The casing 20 with its enclosed meat edibles 32 are mounted on the base sections in a manner similar to that previously described such that the grommets 26 are properly supported by the closure supports.

The gathered sector of the casing 20 is suspended between the closure supports and is adapted to be twisted by means of a pressure-inducing mechanism 250. This mechanism 250 includes a rod 252 which is journaled in a pair of upstanding brackets 254 and 256 supported by the table 246 and interposed between the respective closure supports of the spaced base sections 242 and 244. The rod 252 is formed with a longitudinally extending slot 258 which is adapted to receive the gathered sector of the casing 20. In addition, the rod 252 includes a crank 260 having a suitable handle 262 to facilitate the rotation of the rod 252 in its bearings 254 and 256. Thus, when the gathered sector of the casing 20 is disposed in the slot 258, and the rod 252 rotated by means of its crank arm 260 and handle 262, the grommets 26 will be forced against the meat edibles 32 within the casing 20 to pressurize or compress the contained meat edibles 32. When the meat edibles 32 are sufficiently pressurized, the crimping mechanism incorporated into each of the closure supports is then actuated such that the deformable grommets are crimped over the gathered sector of the casing 20 to thereby hold the meat edibles 32 in their compressed condition. By simply releasing the crimping mechanism for each of the closure supports and retracting the rod 252 to its original position, the gathered sector along with the remaining portion of casing 20 may then be removed from the pressure-packing apparatus 250. The product so processed may subsequently be exposed to the usual conditioning and treatment.

Obviously, the aforementioned objects and advantages are thusly most effectively attained. Although several embodiments of the present invention have been disclosed and described in detail, such is merely for purposes of illustration and is not intended to be limiting. Since the present invention may be varied from that illustrated and described, it accordingly is to be defined by the scope of the appended claim.

I claim:

A method of pressure-packing meat products within a casing for holding compressible boned meat products; providing a dry casing of cellulose fiber material; subjecting said casing to water for a sufficient period of time to render it readily workable and deformable; restricting sectors of said casing by securing means at a location spaced from the ends of said casing to reduce the permissible interior passageway defined by said casing at such sectors; inserting at least one boned meat product into said casing through each of said ends; restricting said casing between each boned meat product as well as at each of said ends by securing means; compressing said boned meat products within said casing by displacing all of said restricted sectors spaced from said restricted ends, towards said restricted ends; maintaining said boned meat products in a compressed condition by fixing the location of the restricted sectors of said casing whereupon the gathered portions of said casing between the fixed restricted sectors is deformable thereby permitting the encased boned meat products to be suspended therefrom; drying said casing; and severing said casing at its restricted sectors.

References Cited in the file of this patent

UNITED STATES PATENTS

| | | |
|---|---|---|
| 1,508,155 | Berg | Sept. 9, 1924 |
| 2,107,166 | Rumsey | Feb. 1, 1938 |
| 2,247,312 | Rumsey | June 24, 1941 |
| 2,493,063 | Frank et al. | Jan. 3, 1950 |
| 2,711,848 | Capps | June 28, 1955 |
| 2,713,449 | Carmichael | July 19, 1955 |
| 2,866,710 | Dowd et al. | Dec. 30, 1958 |
| 2,924,924 | Garapolo et al. | Feb. 16, 1960 |
| 2,968,570 | Pinta et al. | Jan. 17, 1961 |